March 15, 1932.  W. S. SMITH  1,849,439
SAWING MACHINE
Filed July 10, 1931   3 Sheets-Sheet 1

INVENTOR
William S. Smith
By Albert E Dietrich
ATTORNEY

INVENTOR
William S. Smith.
BY Albert F Dieterich
ATTORNEY

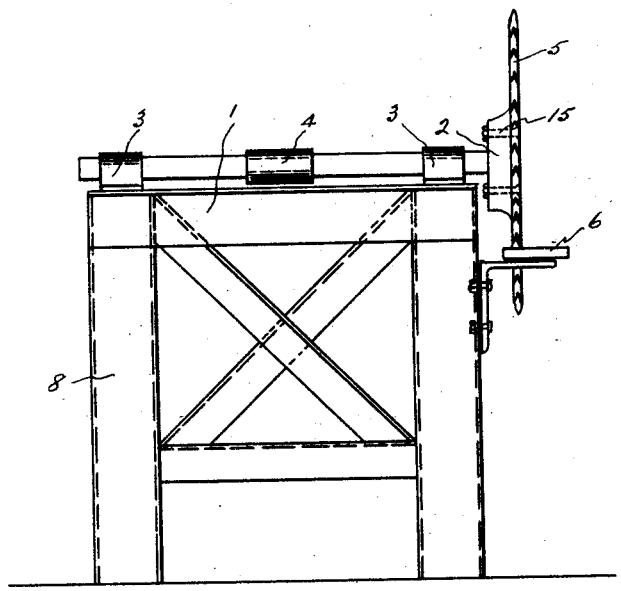
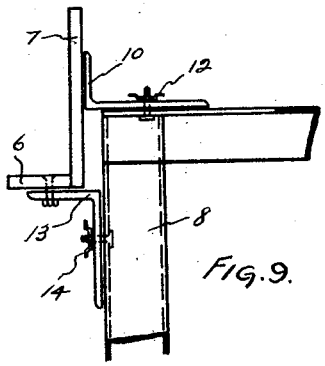
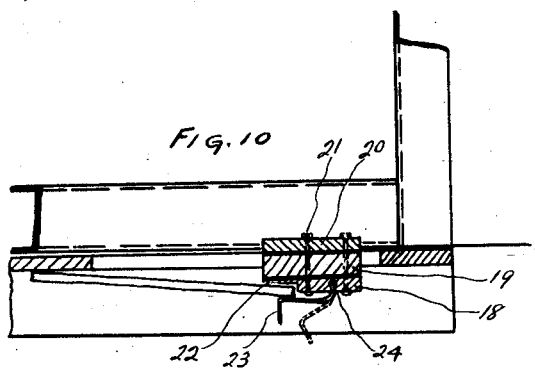
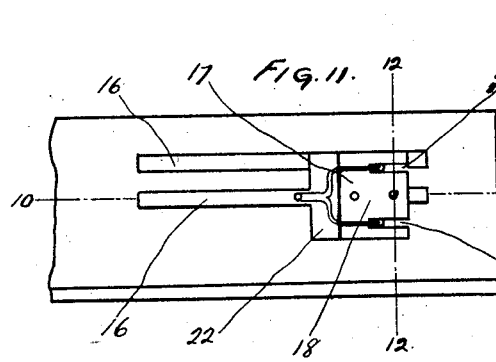
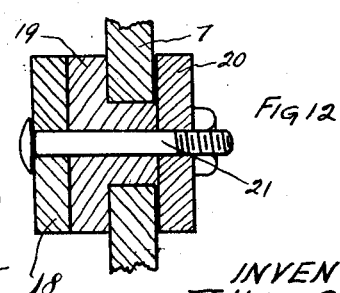

Patented Mar. 15, 1932

1,849,439

UNITED STATES PATENT OFFICE

WILLIAM S. SMITH, OF PORT MOODY, BRITISH COLUMBIA, CANADA, ASSIGNOR TO THE ROBERT McNAIR SHINGLE CO. LTD., OF VANCOUVER, BRITISH COLUMBIA, CANADA

SAWING MACHINE

Application filed July 10, 1931. Serial No. 550,007.

This invention relates to a sawing machine used in the preliminary processing of shingle shakes to true up the end edges so that when the shakes are finally positioned before the splitting saw, a true vertical edge is presented to the saw whereby the shake is sawn in two equal halves, each having two parallel edges where the saw enters and leaves the shake.

The sawing machine herein described is evolved to carry out the "preliminary process" more particularly described in United States Patent No. 1,763,269.

A particular object of the invention has been to design a simple and sturdy piece of mechanism that requires no particular skill to operate, that is safe, and will do the work with the requisite speed for commercial operations.

The particular function of the machine is to prepare the shakes for final splitting into two perfect sawn shakes whereby lumber is conserved and waste eliminated.

With the object of making clear this particular saving of lumber it is to be noted that in the manufacture of shingle shakes, the shakes are cut from a single hand split shake, which hand split shake is split from a block of wood by a frow, and this frow end of the shake is generally of even thickness, but the opposite end of the shake is liable to develop unequal thickness and irregularities by reason of wind in the grain, and it is this particular wind and irregularity of the grain that is responsible for waste in the manufacture of shake shingles if not rectified.

This particular condition is better illustrated by the drawings accompanying and forming part of this application and in which:

Figure 1 is a perspective view of a shake preparatory to re-sawing and showing the irregularity of the contour by which wastage is caused.

Figure 8 is an end view of the machine with guide board and pivotal member removed to more clearly show saw arbor.

Figure 9 is a detail of the opposite corner of the machine to that shown in Figure 7 and shows the adjustable angle member to the back of the guide board by which adjustment of the saw cut is made.

Figure 10 is a sectional plan of the guide board taken on the line 10—10 of Figure 11 showing slide member fixed to the board and showing T-shaped distance piece in slide.

Figure 11 is a front elevation of the slide member secured in one of the slots of the guide board.

Figure 12 is an enlarged sectional end elevation and detail of the slide member taken on the line 12—12 of Figure 11.

Figure 1:
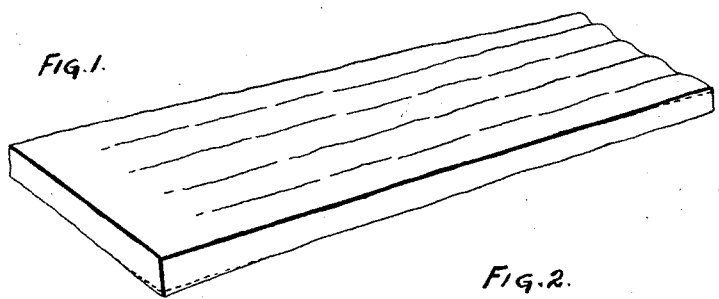
Figure 2:
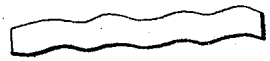
Figure 2 is an end view of the same looking at the end opposite to that where the frow is applied in splitting the shake, i. e., looking from right to left in Figure 1.

In these drawings like numerals indicate like parts and the numeral 1 indicates the sawing machine generally, 2 the saw arbor, 3 the bearings, 4 the drive pulley, and 5 the saw, 6 the saw table, and 7 the guide board positioned back of the saw and outside of the saw frame 8. The guide board 7 is supported at one end by the pivot mounting 9 bolted upon the top of the frame 8 and is made adjustable at the opposite end through the angle brackets 10 and the slotted base 11 thereof secured by the wing nuts 12.

A similar bracket for stiffening the guide board is positioned intermediate the end bracket and the pivot joint 9.

The saw table 6 is made adjustable for height by the provision of the brackets 13 secured upon the frame 8 by bolts and wing nuts 14.

The saw is mounted upon the end of the saw arbor 2 and secured thereon by bolts and nuts 15 and overhangs the frame, as shown in Figure 8.

The guide board 7 has an aperture for the saw arbor to project through and is provided with the longitudinal slots 16 for a slide member 17 to operate in.

The slide member 17 comprises three separate pieces 18, 19 and 20, as shown in Figure 12, and held together by the bolts 21 and the piece 20 is merely a securing member fitting the back of the guide board 7 to hold the slide member 17 in the slots 16.

The centre member 19 comprising the slide is T-shaped in section and made to fit the slot 16 freely while the vertical portion shown in Figure 12 is in effect a distance piece to hold one end of the shake being sawn a sufficient distance from the guide board 7 so that the opposite end of the shake is angularly disposed toward the saw, see Figure 10.

The outer piece 18 of the slide member has a recess 22 cut in the corner facing the saw in which the end of a shake may be positioned for sawing.

A pivoted handle member 23 is secured upon the bolt 24 and serves as a clamp to hold the shake in the recess 22 while the shake is being traversed up against the saw.

Slots 25 are cut in the end of the outer piece 18 as shown in Figure 11, to permit of movement and mounting of the handle member 23.

In use, shakes requiring trimming are positioned under the handle 23 of the slide member 17 and assume the position, as shown in Figure 10, with the end corner of the shake nearest the saw contacting the face of the guide board 7 and in this position are fed into the saw.

Figure 4:
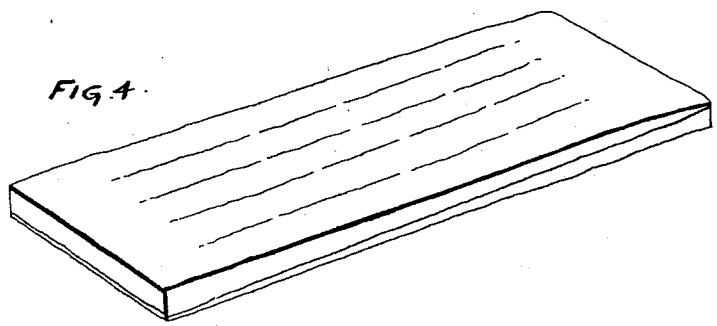
Figure 4 is a perspective view of the same shake shown in Figure 1 after being passed through my preliminary sawing machine and having the irregular contoured end removed.
Figure 5:
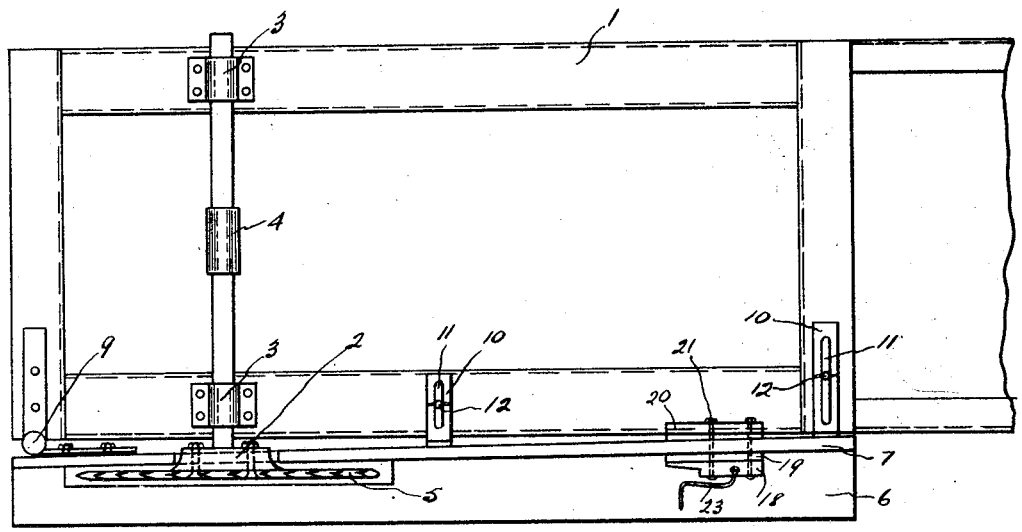
Figure 5 is a plan view of the sawing machine.
Figure 6:
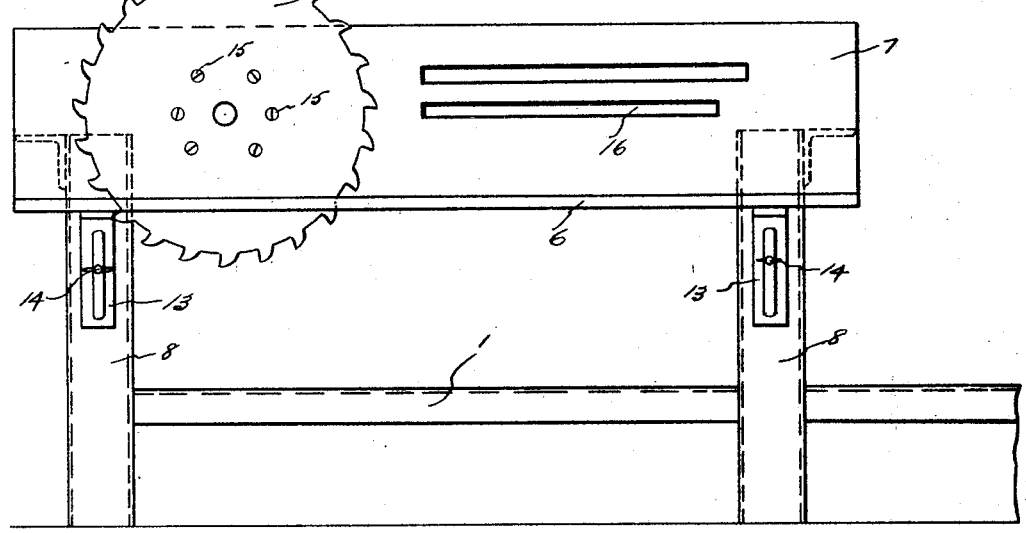
Figure 6 is an elevation of the sawing machine, and shows slots in the guide board for sliding member, also adjustable saw table.
Figure 7:
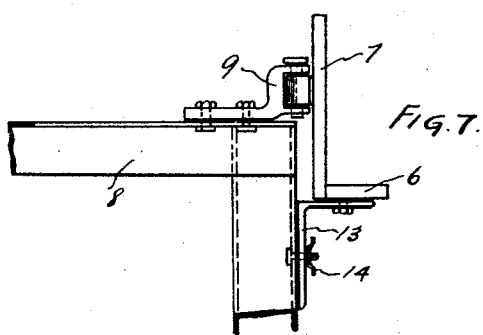
Figure 7 is a detail view of one corner of the machine showing pivot mounting to which the guide board is secured.

The saw being positioned closely to the guide board removes a small angular corner from the shake and leaves the shake in the condition shown in Figure 4 and ready for the splitting saw.

Figure 3:
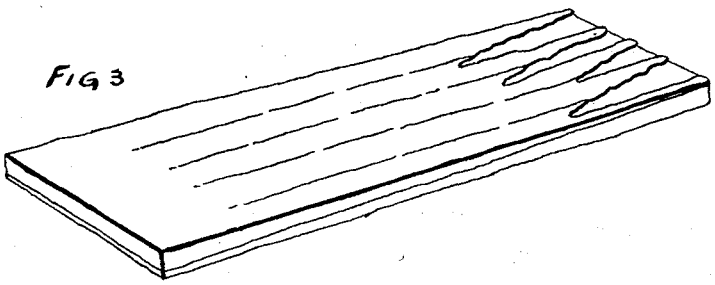
Figure 3 is a perspective view of the same shake but with the diagonal saw cut dividing the shake into two shingle shakes wherein it is seen that because of the irregular contour at the right hand end the saw has intersected the top surface at an irregular line and wastage of the top shingle shake occurs.

By this preliminary treatment of the shakes before splitting or re-sawing of them much lumber is conserved and waste eliminated as it is impossible for the splitting saw to run out upon an uneven surface, as shown in Figure 3, and thereby make a "cull" shake.

Having now described my invention, what I claim as new and desire to be protected in by Letters Patent, is:

1. In a sawing machine of the kind described having a framework and bearings and saw arbor and pulley mounted thereon together with power driving means, the combination comprising a saw secured to one end of said arbor whereby said saw overhangs the side of said frame, a table secured to the side of said frame, a slot in said table for the saw to operate therethrough, a pivoted guide member positioned alongside of said saw and intermediate of said frame and saw, and means for adjusting said pivoted guide to and from said saw, and means for traversing a board alongside said pivoted guide member.

2. In a sawing machine of the kind described having a framework and bearings and saw arbor and pulley mounted thereon together with power driving means, the combination comprising a saw secured to one end of said arbor whereby said saw overhangs the side of said frame, a table secured to the side of said frame, a slot in said table for the saw to operate therethrough, a pivoted guide member positioned alongside said saw and intermediate said frame and saw, and means for adjusting said pivoted guide to and from said saw, said means comprising angle members secured on the back of said guide member, said angle members having a slotted base and holding down bolt and wing nut, whereby said angle members and one end of said guide member may be moved to and from said saw to adjust the cut of said saw, and means for traversing a board alongside said pivoted guide member.

3. In a sawing machine of the kind described having a framework and bearings and saw arbor and pulley mounted thereon together with power driving means, the combination comprising a saw secured to one end of said arbor whereby said saw overhangs the side of said frame, a table secured to the side of said frame, a slot in said table for the saw to operate therethrough, a pivoted guide member positioned alongside said saw and intermediate of said frame and saw, and means for adjusting said pivoted guide to and from said saw, and means for traversing a board alongside said pivoted guide member, said means comprising longitudinal slots formed in the side of said guide member to form a slideway, a slide member fitting said slots, said slide member having a distance piece on one face thereof, a pivoted handle fitting said slide member to form a clamp whereby the end of a board may be secured under said clamp and between said distance piece for traversing the opposite end of said board through said saw.

In testimony whereof I affix my signature.

WILLIAM S. SMITH.